No. 678,970. Patented July 23, 1901.
P. NAEF.
APPARATUS FOR MAKING BLEACHING POWDER.
(Application filed Apr. 24, 1900.)
(No Model.)
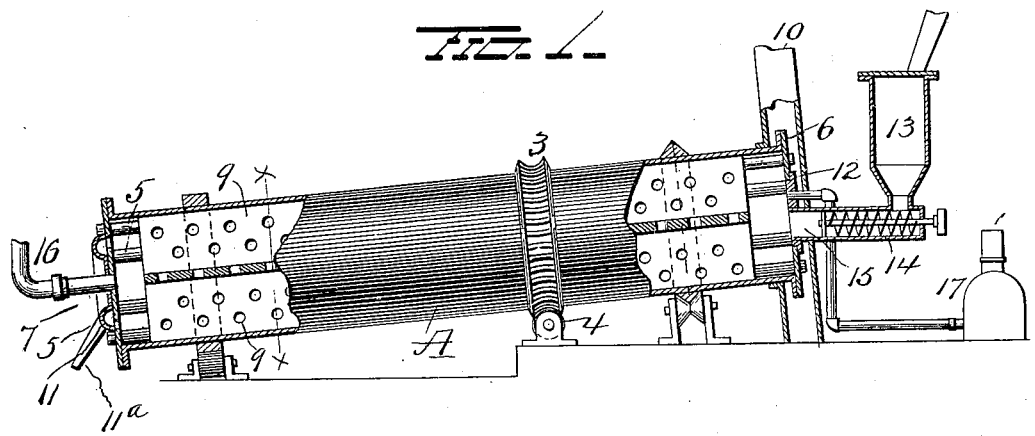
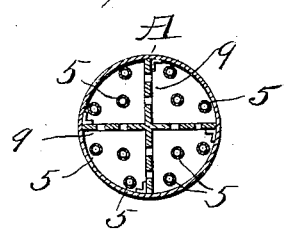
WITNESSES
E. J. Nottingham
G. F. Downing
INVENTOR
Paul Naef
By H. A. Seymour
Attorney

UNITED STATES PATENT OFFICE.

PAUL NAEF, OF NEW YORK, N. Y.

APPARATUS FOR MAKING BLEACHING-POWDER.

SPECIFICATION forming part of Letters Patent No. 678,970, dated July 23, 1901.

Original application filed August 7, 1897, Serial No. 647,463. Divided and this application filed April 24, 1900. Serial No. 14,130. (No model.)

*To all whom it may concern:*

Be it known that I, PAUL NAEF, of New York city, in the county of New York and State of New York, have invented certain new and useful Improvements in Absorbers; and I do hereby declare the following to be a full, clear, and exact description of the invention, such as will enable others skilled in the art to which it appertains to make and use the same.

My invention relates to an improvement in absorbers for use in the manufacture of bleaching-powder, the same being shown and described in my application for patent for the manufacture of chlorin, Serial No. 647,463, filed August 7, 1897, of which this application is a division, the objects of the present invention being to provide a simple and efficient absorber by means of which a large amount of bleaching-powder can be manufactured in a short length of time and to so construct the apparatus that the parts thereof will not become clogged or coated during the treatment of the lime therein.

With these objects in view the invention consists in certain novel features of construction and combinations and arrangements of parts, as hereinafter set forth, and pointed out in the claims.

In the accompanying drawings, Figure 1 is an elevation, partly in section, of an apparatus embodying my invention. Fig. 2 is a sectional view on the line *x x* of Fig. 1.

A represents a cylinder disposed in an inclined position on suitable rolling supports 1 2, one of which is preferably grooved to receive a rib on the cylinder for the purpose of preventing longitudinal movement of the cylinder. The cylinder is provided at a suitable point between its ends with a circumferential worm-wheel 3, to which motion is imparted by a worm 4 for rotating the cylinder. The absorber-cylinder is provided interiorly with pipes 5, which pass through the end plates 6 7 of the cylinder and open at their respective ends. These pipes perform a double function. They lift and shower the lime and they are also used for cooling purposes, to carry off the heat formed by the combination of lime and chlorin, for which purpose the ends of the pipes are left open to permit a free flow of air through them. If desired, water may be made to flow through the pipes. The cylinder is also provided interiorly with a series of radial perforated lifting-partitions 9, which as the cylinder revolves raise the lime and then drop it upon the pipes 5, thus not only keeping the lime agitated and free to absorb a large amount of chlorin quickly, but also serving to prevent the collection of lime on said pipes, and thus avoiding the insulation of the same by a crust or coating of lime. The higher end of the cylinder is surrounded by a casing $9^a$, which communicates with a chimney 10 for the purpose of increasing the draft through the pipes 5. The end plate 6 of the cylinder is made in the form of a ring, which is normally closed by a plate 12, fixed in any suitable manner in the casing $9^a$. A hopper 13 for lime is located near the higher end of the cylinder and communicates at its bottom with a screw conveyer or feeder 14, and the latter communicates with the cylinder by means of a short section of pipe 15, passing through the fixed plate 12. Chlorin is introduced into the lower end of the cylinder through a pipe 16 from any convenient source.

If desired, a suction fan or pump 17 may be connected with the cylinder for the purpose of drawing off waste gases.

The material is discharged from the absorber through openings in the end plate closing the lower end of the cylinder. To prevent escape of gas, the holes in the end plate are with advantage covered by a stationary hollow ring 11, into which the material is first discharged and from which it empties itself through a suitable pipe $11^a$.

Having fully described my invention, what I claim as new, and desire to secure by Letters Patent, is—

1. An absorber comprising a revoluble cylinder, an annular series of disconnected pipes fixed in the cylinder, spaced apart and projecting through the ends thereof, for the passage of cooling fluid and radial perforated partitions fixed in the cylinder, said partitions spaced from and disposed between pipes of the series of pipes so as to shower absorbent upon and among the latter.

2. In apparatus for making bleaching-powder, the combination of a revoluble cylinder, a feeding device at one end of said cylinder for feeding lime thereinto, a pipe communicating with the other end of said cylinder for discharging chlorin gas thereinto, cooling-pipes disposed in the cylinder and extending through the end thereof, a flue communicating with said pipes at one end thereof and means for withdrawing waste gases from the cylinder.

3. An absorber consisting of a revoluble cylinder, agitators therein, a ring secured to one end of said cylinder, a stationary plate supported independently of the cylinder and coöperating with said ring to close the end of the cylinder and a hopper communicating with the cylinder through said fixed plate and cooling-pipes extending through the cylinder, substantially as set forth.

4. The combination of a revoluble cylinder, a number of pipes passing through the cylinder, said pipes spaced apart so as to leave unobstructed spaces between and among them, and radial devices disposed within the cylinder and projecting among and spaced from said pipes for lifting material and showering it upon and among said pipes.

5. An absorber comprising a revoluble cylinder, means for inserting absorbing material and means for injecting gas into said cylinder, a series of disconnected cooling-pipes disposed in the cylinder, extending through the ends thereof and spaced apart, and a series of radial perforated partitions extending from the center to the peripheral wall of the cylinder and spaced from said cooling-pipes.

In testimony whereof I have signed this specification in the presence of two subscribing witnesses.

PAUL NAEF.

Witnesses:
 CHAS. F. PORTER,
 GEO. V. MORTON.